(12) United States Patent
Aiudi et al.

(10) Patent No.: US 8,215,847 B2
(45) Date of Patent: Jul. 10, 2012

(54) COMMUNICATIONS CONNECTORS AND METHODS OF USING THE SAME

(75) Inventors: Michael J. Aiudi, South Glastonbury, CT (US); Lawrence P. Kaider, Wallingford, CT (US); Jari M. Taskila, Meriden, CT (US); Aaron T. Rose, Hamden, CT (US); Andrzej E. Stanek, New Haven, CT (US); Peter A. Casey, Clinton, CT (US); Yin-Shing Chong, Middletown, CT (US)

(73) Assignee: Alcatel Lucent, Paris (FR)

( * ) Notice: Subject to any disclaimer, the term of this patent is extended or adjusted under 35 U.S.C. 154(b) by 233 days.

(21) Appl. No.: 12/656,388

(22) Filed: Jan. 28, 2010

(65) Prior Publication Data

US 2011/0182551 A1    Jul. 28, 2011

(51) Int. Cl.
  *G02B 6/36* (2006.01)
  *H01R 13/52* (2006.01)
  *H01R 13/648* (2006.01)
  *H01R 9/05* (2006.01)
  *H01R 33/00* (2006.01)
  *H01R 43/16* (2006.01)

(52) U.S. Cl. ............ 385/53; 385/101; 385/76; 385/139; 439/271; 439/108; 439/578; 439/577; 439/638; 29/874

(58) Field of Classification Search ............. 385/53, 385/100, 77, 76, 78, 80, 59, 60, 62, 101, 385/137, 138, 139; 439/271, 577, 578, 638, 439/108; 29/874
See application file for complete search history.

(56) References Cited

U.S. PATENT DOCUMENTS

| | | | |
|---|---|---|---|
| 6,719,461 B2 * | 4/2004 | Cull | 385/71 |
| 6,736,545 B2 * | 5/2004 | Cairns et al. | 385/56 |
| 7,553,090 B2 * | 6/2009 | Schempp et al. | 385/89 |
| 2002/0126967 A1 * | 9/2002 | Panak et al. | 385/101 |
| 2006/0093277 A1 * | 5/2006 | Mulligan | 385/75 |
| 2007/0160327 A1 * | 7/2007 | Lewallen et al. | 385/53 |
| 2007/0217746 A1 * | 9/2007 | Schempp et al. | 385/58 |
| 2011/0182551 A1 * | 7/2011 | Aiudi et al. | 385/53 |

* cited by examiner

*Primary Examiner* — Brian Healy
(74) *Attorney, Agent, or Firm* — Harness, Dickey & Pierce (57) ABSTRACT

Communications connectors communicatively and physically join a plurality of network elements. Communications connectors are substantially flangeless so as to provide a substantially continuous surface between the connector and network elements joined thereto. Communications connectors may include or be modified with a grounding surface or a seating member. Communications connectors include a variety of communicative contact surfaces and joining mechanisms, including those compatible with known 7/16 DIN connections. Methods include installing network elements to connection interfaces on connectors without the use of a flange or other exterior part. Methods optionally include applying an adhesive to connection interfaces to provide a breakable, locked connection between network elements and connectors.

19 Claims, 6 Drawing Sheets

COMMUNICATIONS CONNECTORS AND METHODS OF USING THE SAME

BACKGROUND

1. Field

Example embodiments generally relate to connectors and adaptors for communicative connections and methods of using connectors and adaptors.

2. Description of Related Art

Figure 1:
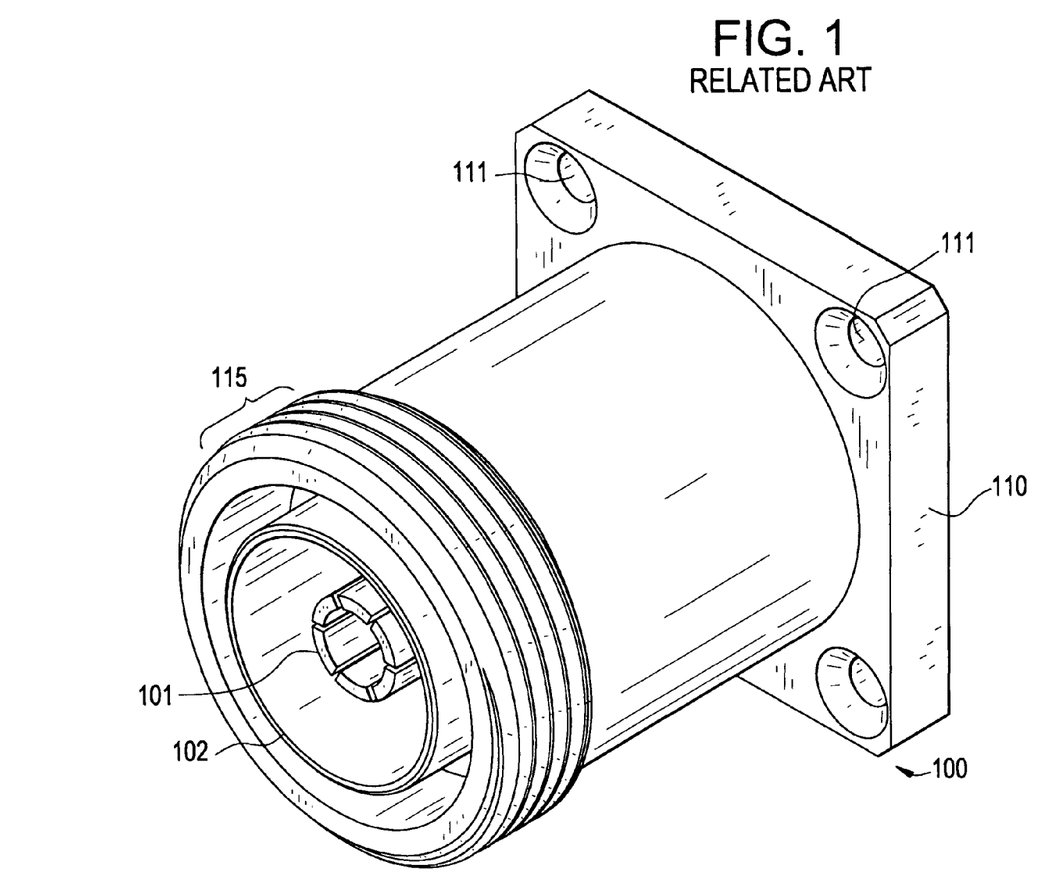
FIG. 1 is an illustration of a conventional communications connector.

FIG. 1 is an illustration of a conventional securable connector 100 used to connect telecommunications elements, including co-axial cable, fiber-optic cable, electrical wiring, etc. For example, connector 100 may be a 7/16 DIN connector for communicatively connecting coaxial cable. Several different types of 7/16 DIN connectors are known in the art and typically have a 7 mm inner contact 101 and 16 mm outer contact 102 for interfacing and connecting multiple telecommunications elements.

As shown in FIG. 1, conventional securable connector 100 includes a flange 110 extending outwards from a central portion of connector 100. Flange 110 is shown as square, but other flange shapes are known. Flange 110 provides both electrical grounding and a physically securable surface for connector 100. For example, flange 110 may be secured to a larger telecommunications element to hold connector 100 in a given space. Holes 111 extend through flange 110 to permit screws or other fasteners to join and hold connector 100 to other elements by flange 110. For example, connector 100 may be secured to network-operated equipment by screwing flange 110 to the network-operated equipment through holes 111. In this way, customer-operated equipment may be connected to connector 100 and network-operated equipment while preventing the customer from accessing the network's equipment or removing connector 100 from such network-owned equipment.

Washers, gaskets, and other fasteners and interface devices (not shown in FIG. 1) are known and useable with connector 100. For example, a stamped gasket having a shape matching flange 110 may seat between connector 100 and equipment connected thereto to prevent wear and facilitate connection.

SUMMARY

Example embodiments include communications connectors that communicatively and physically join a plurality of network elements. Example embodiment communications connectors are flangeless so as to provide a substantially continuous surface between the connector and network elements joined thereto. Example embodiment communications connectors may include a variety of additional features depending on the desired application. For example, a grounding surface and a seating member may be included in example embodiment communications connectors. Example embodiment communications connectors may feature a variety of communicative contact surfaces and joining mechanisms, including those compatible with known 7/16 DIN connections.

Example methods include installing network elements to connection interfaces on example embodiment connectors without the use of a flange or other exterior part. Example methods may include applying an adhesive to connection interfaces to provide a breakable, locked connection between network elements and example embodiment connectors. Example methods may be compatible with installing example embodiment connectors compatible with known 7/16 DIN connections.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

The inventors have recognized that conventional flanged communications connectors may have increased manufacturing and installation costs due to pneumatic assembly equipment, component machining, and other operations required to form and install an external flange. Gaskets and other components used with conventional flanged connectors further must be stamped to match flange shape and size, which can vary by application, requiring additional resources to match components with connector flange configuration. Installation of several different parts with conventional connectors, including gaskets, screws, etc. consumes increased amounts of installation time.

The inventors have further recognized that conventional flanged communications connector have several subtle operational deficiencies. An external flange provides a route for water ingress and corrosion in connectors and elements connected thereby. The flange further provides an invitation for customers or other unauthorized users to manipulate or interact with conventional connectors, potentially damaging the connectors or gaining unauthorized access to elements connected thereby. Using a flange to hold a conventional connector in position further results in increased damage to external screws and flange holding the connector to other external elements. Each of these deficiencies may not be recognized upon installation and use, as the inventors have recognized them only after significant conventional connector use.

Example embodiments address these and/or other problems, in order to provide advantages over the conventional connectors described above. Particularly, the inventors have conceived several example embodiment communication connectors with decreased fabrication and installation resource consumption and/or improved operational characteristics, described below by way of example embodiments.

Figure 2:
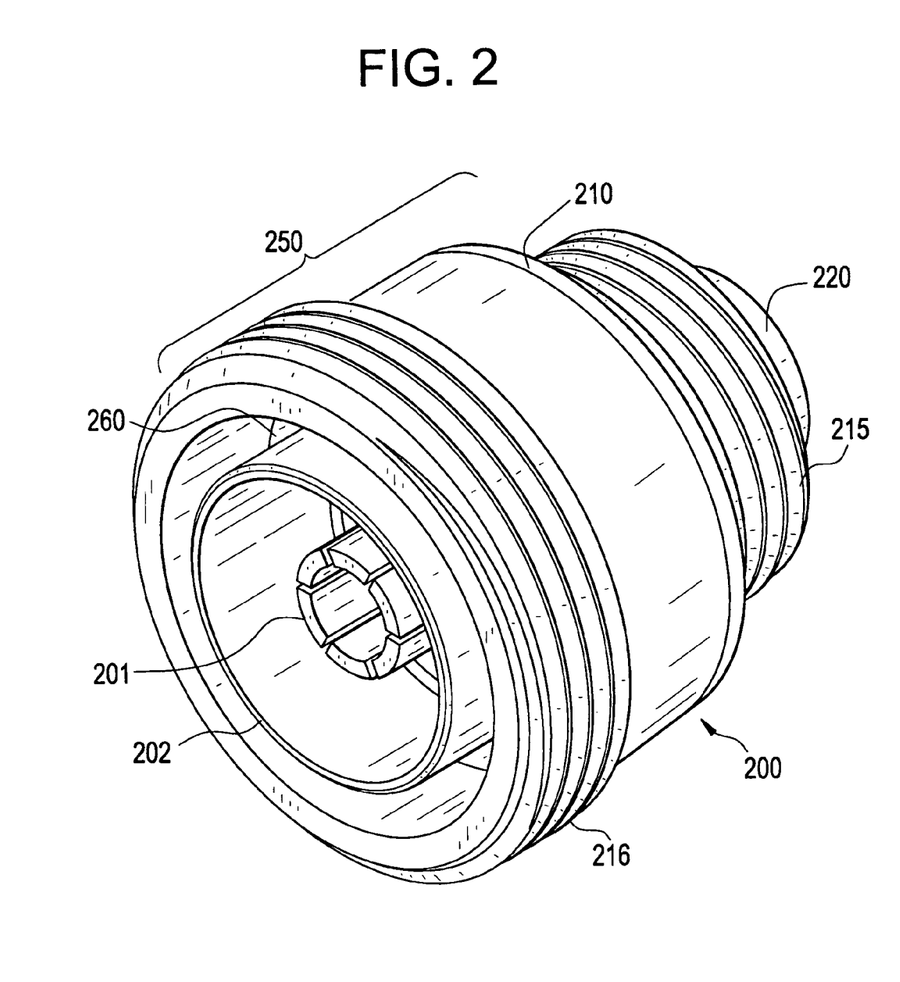
FIG. 2 is an isometric view of an example embodiment communications connector.

FIG. 2 is an illustration of an example embodiment communications connector 200 useable to communicatively and/or physically connect separate network elements. Although no network elements are shown connected by example embodiments, it is understood that any type of network element may be joined to and communicatively connected by example embodiment connectors. For example, example embodiment connector 200 may connect coaxial cable, fiber optic cable, networking components such as filters, amplifiers, transmitters, etc.

As shown in FIG. 2, example embodiment communications connector 200 includes a generally continuous body 250 that includes or connects several features of example embodiment communications connectors. Although body 250 is shown as cylindrical, other shapes and discontinuous parts are useable for body 250.

Body 250 includes connection interfaces usable to physically join different elements to communications connector 200. Connection interfaces may provide any type of desired connection type, including threads, fasteners, augur/tang, adhesive, and/or locking type connections between connector 200 and elements joined thereto. Individual connection interfaces may be similar or may each employ unique, different connection mechanisms. For example, connection interfaces may include first and second threaded surfaces 215 and 216. First threaded surface 215 may connect a particular type of network-owned hardware to a different client-side element connected at second threaded surface 216. First and second threaded surfaces 215 and 216 may have different sizes or thread gauges, depending on the type of network element to be connected to each. FIG. 2 shows a larger threaded surface 216 and smaller threaded surface 215 used as connection interfaces, such that network elements may be screwed onto connector 200, but it is understood that any known connection mechanisms, and modifications of the same, may be used as connection interfaces instead of, or in addition to, threaded surfaces 215 and 216.

Example embodiment communications connector 200 does not include a substantial flange extending outward from a perimeter of body 250. In this way, multiple network elements may be joined to example embodiment connector 200 with substantial perimeter continuity. That is, a cable, wire, socket, and/or other elements joining to connector 200 via a connection interface, such as threaded surface 215 or 216, may present a substantially continuous, unflanged outer surface between body 250 and the networked element. The minimization or lack of a substantial flange may reduce or prevent moisture/foreign material collection and ingress around example embodiment connectors and elements joined thereby, reducing or preventing corrosion and interference caused by moisture or foreign matter in and around example embodiment connectors. Further, the substantially continuous perimeter provided by example embodiment connectors reduces or prevents accidental or unauthorized identification and manipulation/disassembly of example embodiment connectors and elements joined and communicatively connected thereby.

As shown in FIG. 2, example embodiment communications connector 200 may include communications contacts housed in body 250 for communicatively connecting elements joined thereto. For example, FIG. 2 shows body 250 housing an inner contact 201 and outer contact 202 that provide a conductive path or other communication mechanism between connector 200 and elements connected thereto. Inner contact 201 may be, for example, a 7 mm connector, and outer contact 202 may be, for example, a 16 mm connector, such that example embodiment connector 200 may function as a 7/16 DIN female connector. Alternate communications contacts are equally possible, depending on the configuration of elements to be connected by example embodiment connectors. For example, connector 200 could include male communications contacts, contacts with different shapes, contacts at different relative positions, and/or contacts of different sizes. As shown in FIG. 2, if communications contacts such as inner contact 201 and outer contact 202 are positioned within physical connection interface 216 on body 250, network elements may contact or otherwise communicate through contacts 201 and/or 202 while a substantially continuous perimeter may be maintained between a physically and communicatively connected network element and connector 200.

Figure 3:
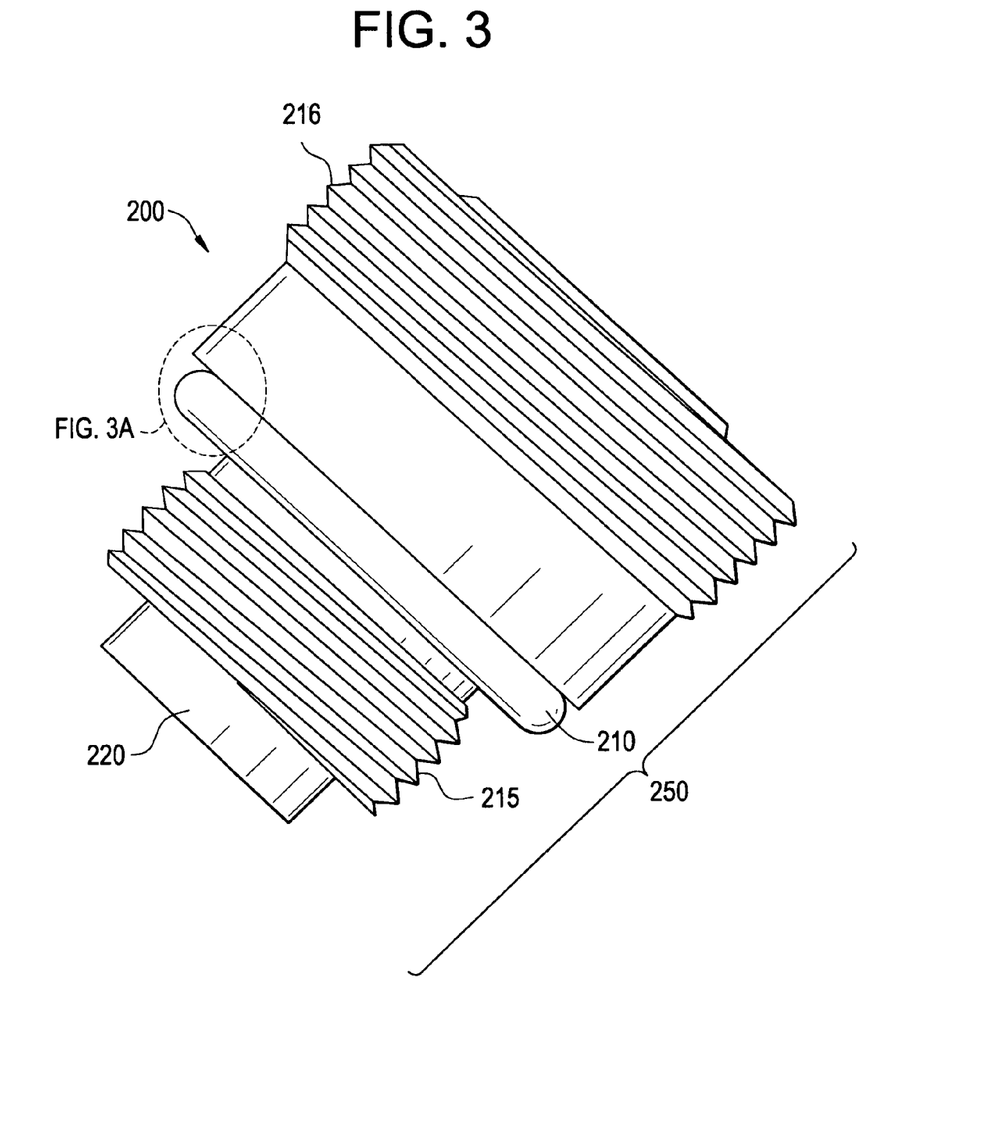
FIG. 3 is a profile view of an example embodiment communications connector.

FIG. 3 is another view of an example embodiment communications connector 200. As shown in FIG. 3, example embodiment connector may include a grounding part on body 250. For example, grounding part may be a ringed surface 220 at an end of body 250 on example embodiment connector 200, although other shapes and positions for grounding parts are possible, depending on the desired application. Grounding surface 220 may be electrically connected to body 250 to provide electrical grounding for example embodiment connector 200 and/or to elements connected by example embodiment connector 200. Grounding surface 220 may further be sufficiently separated from connection interfaces, such as threaded surfaces 215/216, to prevent signal or current interference by a connection mechanism used in connection interfaces, such as a flowable adhesive applied to threaded surface 215. Because a grounding part may be on body 250 directly contacting a network element attached thereto, instead of on an exterior flange, improved grounding characteristics, such as improved passive intermodulation and return loss are achieved by example embodiment communications connectors.

As further shown in FIG. 3, example embodiment connector 200 may include a deformable seating element on body 250 that facilitates physical connection between connector 200 and joined network elements. For example, a deformable seating element may include an elastic O-ring 210 on a surface of body 250. O-ring 210 may be generally annular and fabricated of any sufficiently flexible material, including rubber, silicone, nitrile, etc. O-ring 210 may sit on body 250 between threaded surfaces 215 and 216, so as to provide an improved seal and/or flexible seating against elements joined to connector 200. Further, because O-ring 210 does not require any stamping or exact size matching to function in example embodiment connectors, O-ring 210 may reduce complexity and resource consumption in fabricating an example embodiment connector 200 having the same.

Figure 3A:
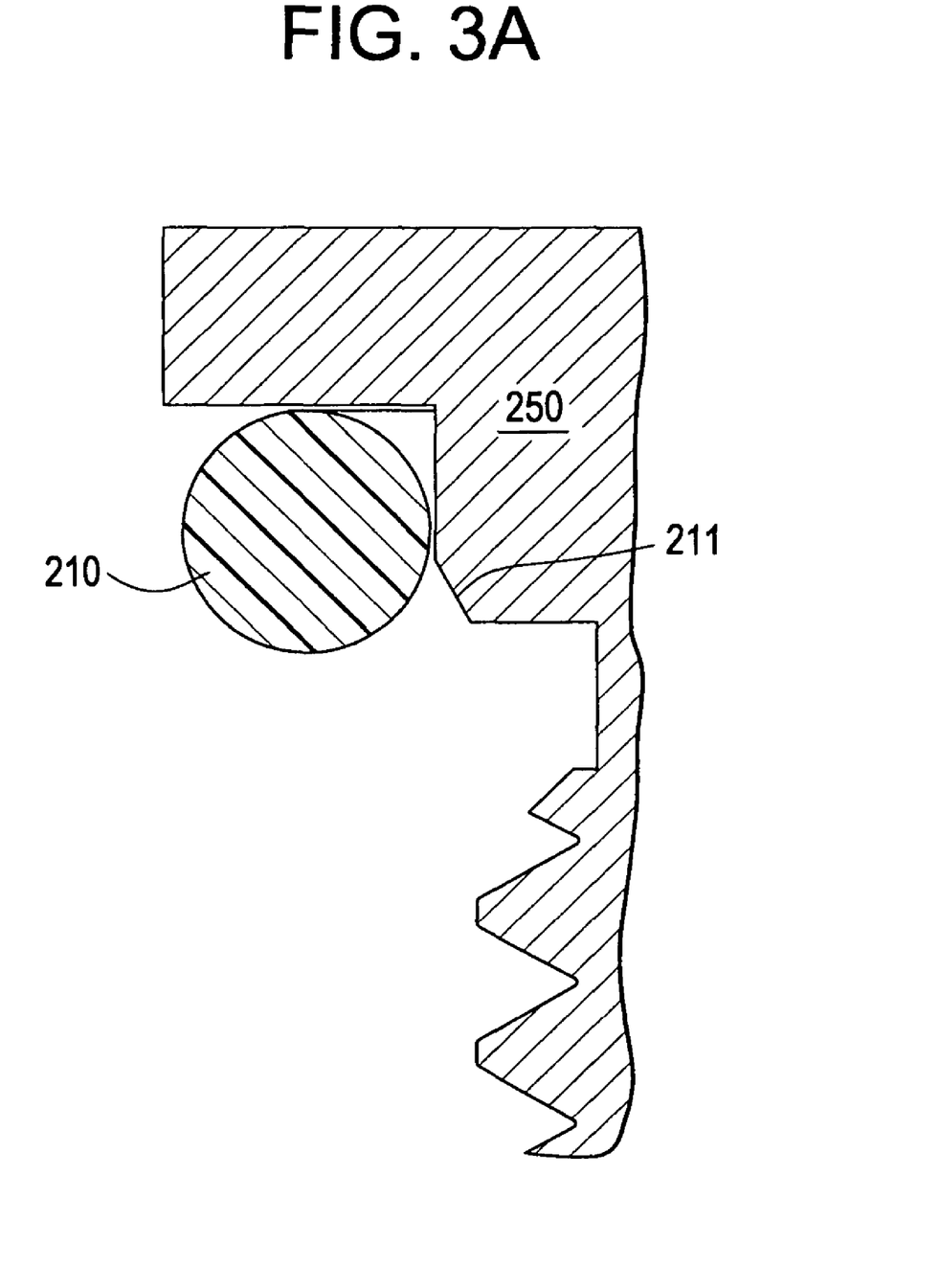
FIG. 3A is a cross-section view of Detail A from FIG. 3.

FIG. 3A is a cross-section of Detail A in FIG. 3. As shown in FIG. 3A, body 250 may include a tapered surface 211 on which a seating element, such as O-ring 210, may rest and be seated. Tapered surface 211 may permit O-ring 210 to move or roll along surface 211 of body 250 without snagging or pinching. O-ring 210 may thus evenly seat against a wall of body 250 and a communications element connected at an opposing connection interface, such as threaded surface 215, to reduce wear and improve moisture/foreign matter impermeability of example embodiment communications connectors.

Alternatively, seating elements such as washers, gaskets, and/or any other plastically or elastically deformable seating element may be placed on example embodiment connectors to provide improved sealing and seating between network elements and connectors. Any of the various seating elements useable with example embodiment connector 200 may not substantially extend from a surface of body 250 so as to provide a substantially continuous perimeter between example embodiment connector 200 and network elements joined thereto, so as to achieve the advantages discussed above.

Figure 4:
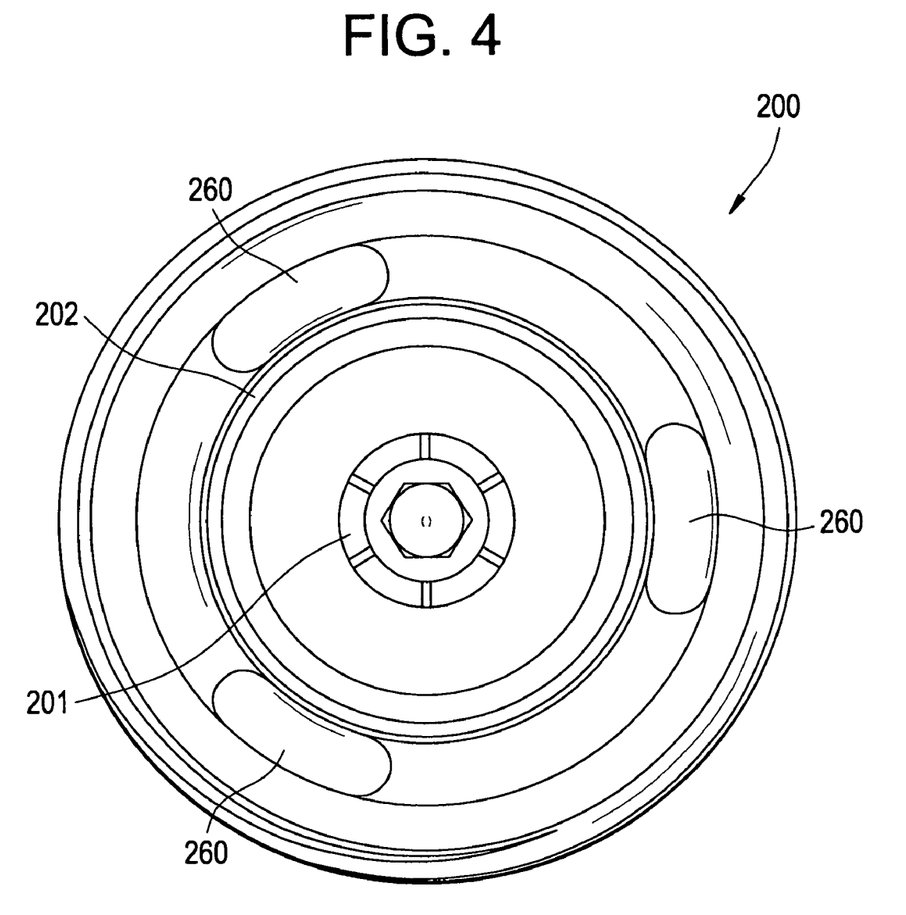
FIG. 4 is another profile view of an example embodiment communications connector.

FIG. 4 is a profile view of example embodiment communications connector 200, showing an end with installation surfaces for installing and using example embodiment communications connector 200. Installation surfaces permit handling and manipulation of example embodiment communications connectors lacking a substantial flange extending from body 250 that, conventionally, would be used for installation.

Installation surfaces may be appropriately chosen based on connection interface types. For example, if a threaded surface connection interface 215 or 216 is used in an example embodiment connector, installation surfaces may include holes 260 that permit rotation and torque to be applied to body 250. The rotation and torque may permit connector 200 to be screwed and tightened to an element connecting at threaded interface 215 or 216. Although holes 260 are shown in one end of example embodiment connector 200 in FIGS. 2 and 4, it is understood that holes 260 may be placed at other positions and still permit handling and manipulation of example connectors lacking a substantial flange. Similarly, other installation surfaces, such as posts, divots, magnets, adhesives etc., may be adapted to permit manipulation and physical joining of alternate interface types on example embodiment connectors and elements connected thereby.

Positioning installation surfaces in an interior and/or non-protruding position in example embodiment communications connectors may further reduce or prevent moisture/foreign material collection and ingress around example embodiment connectors and elements joined thereby, reducing or preventing corrosion and interference caused by moisture or foreign matter in and around example embodiment connectors. Further, the substantially continuous perimeter provided by interior or non-protruding installation surfaces may further reduce or prevent accidental or unauthorized identification and manipulation/disassembly of example embodiment connectors and elements joined and communicatively connected thereby.

Figure 5:
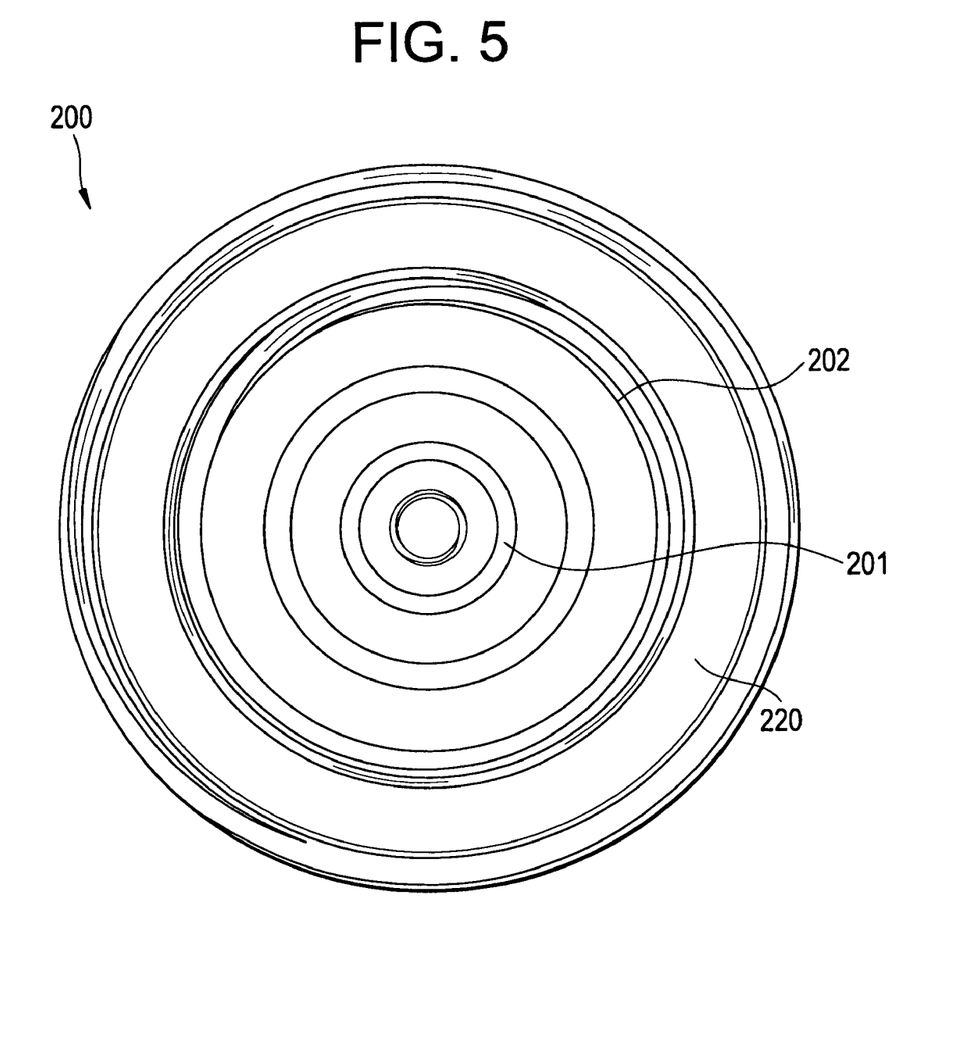
FIG. 5 is another profile view of an example embodiment communications connector.

FIG. 5 is a profile view of example embodiment communications connector 200 from an opposite end of that shown in FIG. 4. FIG. 5 shows an end without installation surfaces and having communications contacts 201 and 202 for connection to a different network element. In this way, example embodiment communications connectors may connector to a plurality of different network elements.

Example embodiment communications connector may be fabricated with a simplified fabrication process that consumes a reduced amount of resources. Lacking a substantial flange on body 250, example embodiment communications connectors may be fabricated with fewer parts, less machining, and without pneumatic pressing. Further, no stamped gasket or other size matching for a flange is required in example embodiment communications connectors.

A variety of common materials may be used to fabricate example embodiment communications connectors. For example, connector 200 may be fabricated of a metal such as nickel, steel, aluminum, etc., or alloys thereof, that is easily acquired and handled. Alternately, connector 200 may be fabricated of a dielectric plastic or composite, if an insulating connector is desired. Communications contacts, such as inner contact 201 and outer contact 202 may similarly be fabricated of a material having desired communications characteristics. For example, contacts 201 and 202 may be fabricated of a conductive material if communication via electric current is desired through connector 200. In light of the forgoing examples, it is understood that virtually any material/materials may be used in example embodiment communications connectors, based on the desired physical and communications properties desired of example embodiments and/or resources available to fabricate the same.

Although example embodiment communications connector 200 has been described and illustrated with body 250 having specific features for connection interfaces, communications contacts, grounding parts, and seating elements, it is understood that any of these features may be readily substituted with other features known in the art that are compatible with specific and diverse applications for example embodiment communications connectors. Similarly, the specific features shown in example embodiment communications connector 200 may be reshaped, resized, repositioned, or otherwise modified in order to be compatible with alternate applications for example embodiment communications connectors. Further, it is understood that grounding parts and/or seating elements may be omitted entirely from example embodiments, depending on the usefulness of these features in a particular application.

Example Installation Methods

Example embodiment communications connectors being described, example methods of using and installing communications connectors are now discussed. While example methods may be used with example embodiment communications connector 200, it is understood that several different types of example embodiment connectors are usable with example methods. As discussed above, example embodiment communications connectors may lack a substantial flange that would conventionally be used to install/handle/manipulate communications connectors with network elements to be communicatively connected. Example methods may permit connection of network elements to example embodiment communications connectors lacking a flange.

Example methods may include applying an adhesive to a connection interface of a communications connector for joining to a network element. For example, a quick-set adhesive, such as loctite, may be applied to threaded surface 215 on body 250. The adhesive may be applied in an amount sufficient to provide a set connection but prevent adhesive flow over grounded ring 220. Application of an adhesive is optional, and may be varied based on the type of physical connection mechanism at the applicable connection interface.

Example methods include joining a first network element to an appropriate end of a communications connector via a connection interface on the connector. The joining may be achieved by using an installation surface on the communications connector that permits joining with the connection interface without significant use of a flange on the communications connector. The joined network element may seat against a seating element upon complete connection to the connection interface. For example, communications connector 200 may be screwed into a filter having a threaded opening (not shown) via threaded surface 215 until the threaded opening seats against O-ring 210. Holes 260 may permit significant screwing and torqing of body 250 into the filter by inserting an instrument into holes 260 and rotating body 250. Any adhesive that may have been applied to the appropriate end may set when the network element is joined thereto.

A second network element may be joined to a different end of the communications connector via a second connection interface. The first and second network element may touch or otherwise interface with corresponding communications contacts within the connector so as to be communicatively connected through the connector. For example, a coaxial cable (not shown) may be screwed onto communications connector 200 via threaded surface 216 until flush with connector 200. The cable may touch contacts 201 and/or 202 in order to communicate via electrical current through example embodiment connector 200 and filter attached thereto. To uninstall network elements joined the to connector, the network elements may simply be removed via the connection interfaces and by breaking any adhesive applied thereto.

Example methods may install flangeless communications connectors through installation surfaces to provide a substantially continuous, unflanged outer surface between connectors and the elements joined thereby. Example methods may be relatively simple and not require multiple parts, such as screws or gaskets, that may require repair or other reworking. Further, use of an adhesive to hold networked elements joined to example embodiment communications connectors may provide a balanced resistance against unauthorized disassembly and nondestructive disassembly of communication connectors and elements connected thereby.

Example embodiments and methods thus being described, it will be appreciated by one skilled in the art that example embodiments may be varied through routine experimentation and without further inventive activity based on desired application. For example, although various example embodiments have been described as lacking a substantial flange, it is understood and easily achieved to use a minimal or post-type flange not extending about an entire perimeter of example connectors and still achieve advantages of example embodiment connectors. Variations are not to be regarded as departure from the spirit and scope of the exemplary embodiments, and all such modifications as would be obvious are intended to be included within the scope of the following claims.

What is claimed is:

1. A communications connector comprising:
   a first connection interface configured to physically join to a first network element;
   a second connection interface configured to physically join to a second network element, the communications connector shaped to provide a substantially continuous outer surface with at least one of the first and the second network elements;
   a first communications contact corresponding to the first connection interface and configured to communicatively connect to the first network element;
   a second communications contact corresponding to the second connection interface and configured to communicatively connect to the second network element; and
   at least one installation surface configured to permit manipulation of the communications connector with respect to an associated network element.

2. The communications connector of claim 1, further comprising:
   a seating element configured to seal a connection between the communications connector and one of the first and the second network elements.

3. The communications connector of claim 2, wherein the seating element is an elastic O-ring, and wherein the communications connector includes a tapered outer surface on which the O-ring sits.

4. The communications connector of claim 1, further comprising:
   a grounding element.

5. The communications connector of claim 4, wherein the grounding element is a conductive ring positioned at an end of the communications connector.

6. The communications connector of claim 1, wherein at least one of the first and the second connection interfaces includes a threaded surface matching a threaded surface of a corresponding network element.

7. The communications connector of claim 1, wherein at least one of the plurality of communications contacts includes at least an inner contact ring and an outer contact ring.

8. The communications connector of claim 1, wherein the associated network element includes at least one of a coaxial cable, a fiber optic cable, and a communications filter, and wherein at least one of the a first communications contact and the second communications contact are shaped to be compatible with 7/16 DIN connections.

9. The communications connector of claim 1, wherein the at least one installation surface includes a plurality of holes on an interior portion of the body that permit rotation of the communications connector.

10. The communications connector of claim 1, further comprising:
    a cylindrical body having a substantially continuous cylindrical outer body, the cylindrical body housing the first and the second communications contacts.

11. A communications connector comprising:
    a body having a substantially continuous cylindrical outer body, the body including,
    a first connection interface configured to physically join to a first network element;
    a second connection interface configured to physically join to a second network element,
    a first communications contact corresponding to the first connection interface and configured to communicatively connect to the first network element, and a second communications contact corresponding to the second connection interface and configured to communicatively connect to the second network element;

a grounding element at an end of the body;

a seating element configured to seal a connection between the communications connector and one of the first and the second network elements; and at least one installation surface configured to permit manipulation of the communications connector with respect to an associated network element.

12. The communications connector of claim 11, wherein the body is generally cylindrical and shaped to provide a substantially continuous outer surface with at least one of the first and the second network elements, wherein the seating element is an elastic O-ring, and wherein the communications connector includes a tapered outer surface on which the O-ring sits.

13. The communications connector of claim 12, wherein at least one of the first and the second connection interfaces includes a threaded surface matching a threaded surface of a corresponding network element, and wherein the associated network element includes at least one of a coaxial cable, a fiber optic cable, and a communications filter.

14. A method of installing a communications connector having a substantially continuous cylindrical outer body, the method comprising:

joining a first network element to a first connection interface on the connector, the joining using an interior installation surface on the communications connector, the interior installation surface configured to permit manipulation of the communications connector with respect to an associated network element; and joining a second network element to a second connection interface on the connector.

15. The method of claim 14, further comprising:

applying an adhesive to one of the first and the second connection interfaces before joining.

16. The method of claim 14, wherein the interior installation surface includes a plurality of interior holes, wherein the first connection interface includes a threaded surface, and wherein the joining the first network element includes rotating the communications connector so as to mate the threaded surface with a matching threaded surface of the first network element.

17. The method of claim 14, wherein the joining the first network element includes seating the first network element against a seating element on an outer surface of the communications connector.

18. The method of claim 17, wherein the seating element includes an elastic O-ring, and wherein the joining the first network element joins the O-ring, communications connector, and the first network element so that a substantially continuous outer surface is formed between the first network element, the O-ring, and the communications connector.

19. The method of claim 14, wherein the joining the first network element and the joining the second network element communicatively and physically joins the first and the second network elements.

* * * * *